No. 856,427.  
PATENTED JUNE 11, 1907.  
W. SCHULZ.  
FLEXIBLE METALLIC HOSE.  
APPLICATION FILED NOV. 12, 1906.
2 SHEETS—SHEET 1.
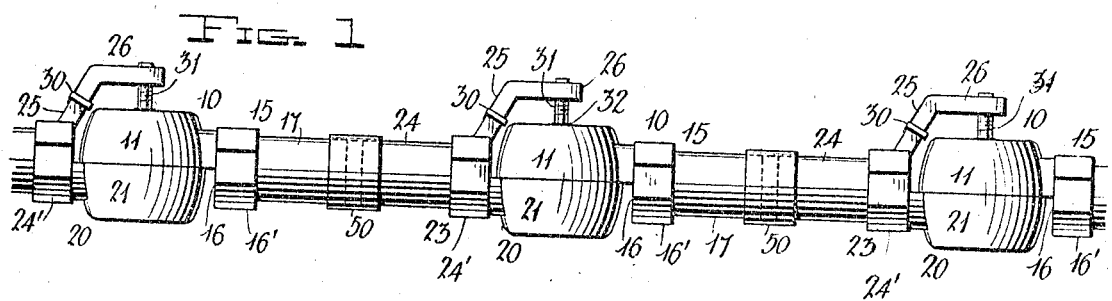
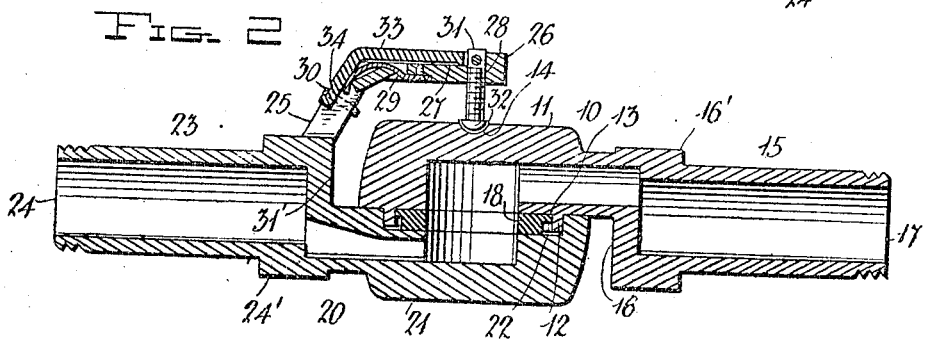
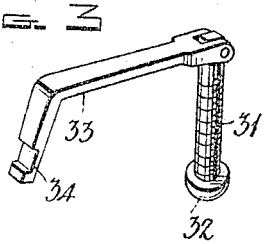
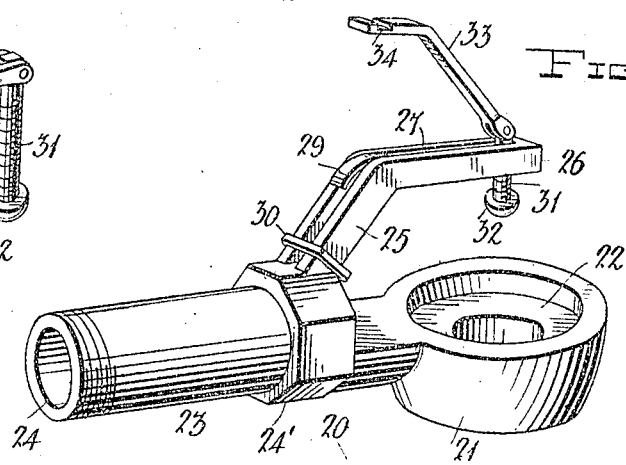
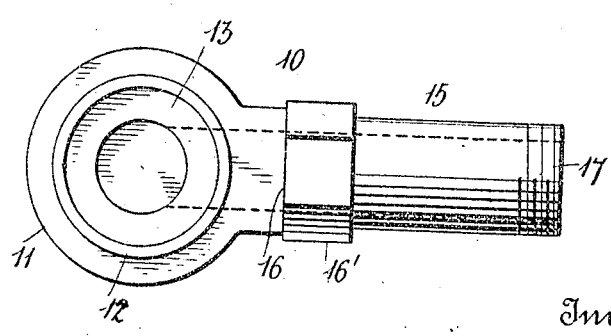
Witnesses  
Inventor  
Wilhelm Schulz  
by  
Attorneys No. 856,427. PATENTED JUNE 11, 1907.
W. SCHULZ.
FLEXIBLE METALLIC HOSE.
APPLICATION FILED NOV. 12, 1906.
2 SHEETS—SHEET 2.
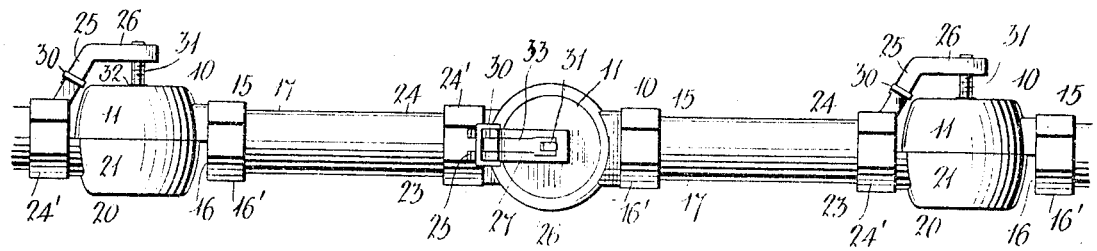
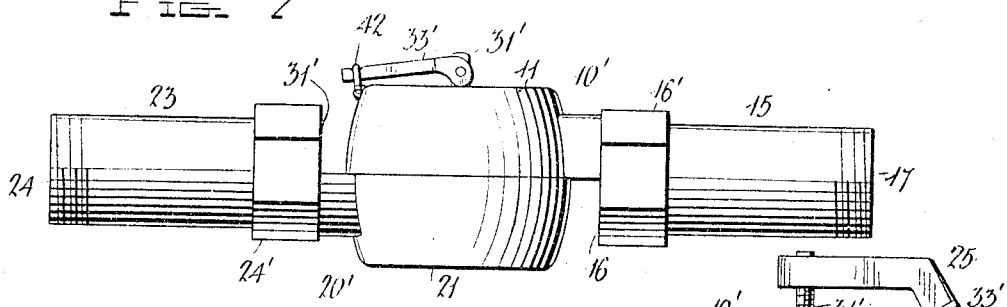
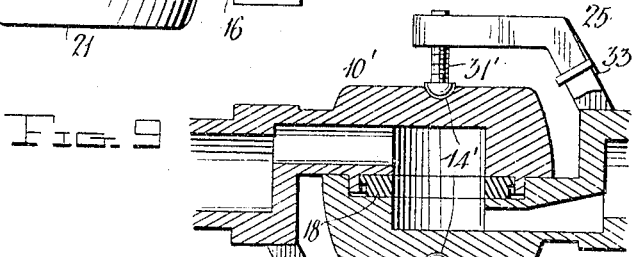
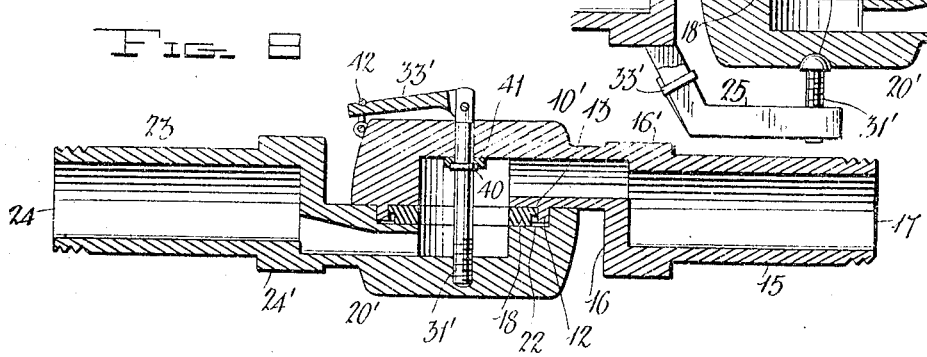
Witnesses
Inventor
Wilhelm Schulz
by H. B. Willson & Co
Attorneys

UNITED STATES PATENT OFFICE.

WILHELM SCHULZ, OF HOUSTON, TEXAS.

FLEXIBLE METALLIC HOSE.

No. 856,427.  Specification of Letters Patent.  Patented June 11, 1907.

Application filed November 12, 1906. Serial No. 343,088.

*To all whom it may concern:*

Be it known that I, WILHELM SCHULZ, a citizen of the United States, residing at Houston, in the county of Harris and State of Texas, have invented certain new and useful Improvements in a Flexible Metallic Hose; and I do declare the following to be a full, clear, and exact description of the invention, such as will enable others skilled in the art to which it appertains to make and use the same.

This invention relates to a flexible metallic hose.

The object of the invention is to produce a flexible metallic hose for air, steam, or other purposes to be used instead of rubber hose, between cars and other places where flexibility and indestructibility are necessary.

Figure 1 of the accompanying drawings represents a side elevation of a portion of a hose constructed in accordance with this invention; Fig. 2 represents a longitudinal section through one of the links or sections; Fig. 3 represents a perspective view of the screw bolt and operating lever connected therewith; Fig. 4 represents a perspective view of the member having a bolt carrying bracket mounted thereon with the lever in slightly open position; Fig. 5 represents a top plan view of the other link member; Fig. 6 represents a side elevation of a slightly modified form of the invention; Fig. 7 represents a side elevation of another modification; Fig. 8 represents a longitudinal section of the modification shown in Fig. 7; and Fig. 9 represents a longitudinal section of another modification of the invention.

In the embodiment shown in Figs. 1 to 5, a flexible metallic hose or pipe is formed of a plurality of connected members 10 and 20. The member 10 consists of a bowl-shaped or hollow hemispherical portion 11 having an annular upwardly projecting flange or rib 12 spaced from the inner edge of the opening therein to provide a gasket seat 13. This portion 11 has a socket 14 in its outer face in the crest thereof to receive a clamping screw bolt hereinafter described. A tubular portion or pipe 15 extends from one side of the hollow portion 11 and is offset at 16 and extended laterally at 17 with said lateral extension 17 screw-threaded exteriorly for connection to a similar section or link by a coupling sleeve 50. A reinforcing shoulder 16' is formed on the pipe 15. A gasket 18 of rubber, lead, or other suitable material is disposed in the seat 13 and projects slightly beyond the flange 12.

The link member 20 comprises a hollow hemispherical portion 21 of the same general construction as the part 11 of the member 10 except that its flat face has a depression 22 surrounding the edge of its opening to form a seat for the flange and gasket of the member 10. A pipe 23 leads from one side of this rounded member 10 and is offset and enlarged to form a lateral extension 24 which is also exteriorly screw-threaded for connection with the adjacent hose section. A reinforcing shoulder 24' is formed at the offset portion of the pipe 31. A standard 25 is mounted on the member 20 preferably on the shoulder 24' thereof and provided with a lateral arm 26 having a recess 27 in its outer face and a transverse screw-threaded opening 28 in its free end. A spring 29 is attached to said arm, preferably at its junction with the standard, and a ring 30 is slidably disposed on said standard for a purpose soon to be described.

A screw-threaded bolt 31 extends through the opening 28 in the end of the arm 26 and has a rounded head 32 on one end and a lever 33 is pivoted to the other end thereof, the head 32 being adapted to turn in the socket 14 of the member 10 to lock the members 10 and 20 movably together, a ball and socket joint being formed thereby. This lever 33 is preferably bifurcated at the end which is connected to the bolt 31 and is adapted to swing from the top of said screw-bolt. The free end of this lever 33 is preferably bent to fit the angle at the junction of the arm and standard and has a notch 34 with which the ring 30 is engaged and in conjunction with the spring 29 holds said lever in closed position.

To assemble the parts of this hose section, the round part 11 of the member 10 is placed over the part 21 of the member 20 with the gasket 18 arranged between them. The lever 33 is then swung over with its bent end extended in position to serve as a handle for turning the bolt. The lever is turned until the head 32 of the bolt 31 fits in the socket 14 and secures the members together. The lever 33 is then swung over into the recess or groove 27 with the wall face of its bent end bearing on the spring 29, the ring is slid over said end into the notch 34 and the parts are locked in operative position, the members 10 and 20 being held together against disengagement and movable laterally relatively to each other. To disconnect the parts, the operation is reversed.

In the form shown in Fig. 6, each section has a hemispherical portion arranged at its opposite ends, one of said rounded portions being disposed at an angle to the rounded portion at the other end.

In the form shown in Figs. 7 and 8, the members 10' and 20' are made similar to the members 10 and 20 except that the brackets formed on the standard and arm are dispensed with, and a connecting screw-bolt 31' is extended through the bowl-shaped portion of the member 20' and is screwed into a screw-threaded socket on the inner face of the bowl-shaped part of the member 10'. A metal collar 40 is secured to the bolt 31' inside the member 25 with a rubber or lead gasket 41 disposed between the collar and the inner face of the portion 21'. The outer end of the bolt has a lever 33' pivoted thereto which is adapted to be swung down and clamped by the ring or loop 42.

In the form shown in Fig. 9, the members 10" and 20", are made similar to the members 10 and 20, except that two brackets 25 are shown, one on each side of the hose and each having a lever 33' and the screw-bolt 31' for engaging sockets, as 14', in the members 10" and 20".

I claim as my invention:—

1. A flexible metallic hose composed of a plurality of connected sections or links, each section comprising two members, one member having an annular recess in its face and the other member having an annular projection to fit in said recess, a gasket disposed between the meeting faces of said members, a screw-bolt engaging one of said members, a lever pivotally connected with said screw-bolt, and means for locking said lever in closed position to hold said members together.

2. A flexible metallic hose composed of a plurality of connected sections or links, each section comprising two members, one member having an annular recess in its flat face and the other member having an annular projection to fit in said recess, a gasket disposed between the meeting faces of said members, a screw-bolt engaging one of said members, a lever pivotally connected with said screw-bolt, and a link for engaging said lever to lock said members together.

3. A flexible metallic hose composed of a plurality of connected sections or links, each section comprising two members, one member having an annular recess therein and the other member having an annular projection to fit in said recess, a gasket disposed between the meeting faces of said members, a bracket disposed on one of said members and extending over the other member, a screw-bolt mounted in said bracket and engaging one of said members, a lever pivoted to said screw-bolt, and a link carried by said bracket and adapted to engage said lever to lock the members together.

4. A flexible metallic hose composed of a plurality of connected sections or links, each section comprising two members, one member having an annular recess therein and the other member having an annular projection to fit in said recess, a gasket disposed between the meeting faces of said members, a bracket disposed on one of said members and extending over the other member, a screw-bolt mounted in said bracket and engaging one of said members, a lever pivoted to said screw-bolt, said bracket having a recess to receive said lever, and a link carried by said bracket adapted to engage said lever.

5. A flexible metallic hose composed of a plurality of connected sections or links, each section comprising two members, one member having an annular recess therein and the other member having an annular projection to fit in said recess, a gasket disposed between the meeting faces of said members, a bracket disposed on one of said members and extending over the other member, a screw-bolt mounted in said bracket and engaging one of said members, a lever pivoted to said screw bolt, said bracket having a recess to receive said lever, a spring in said recess, and a link on said bracket to engage said lever.

In testimony whereof I have hereunto set my hand in presence of two subscribing witnesses.

WILHELM SCHULZ.

Witnesses:
A. H. KERSTEN,
WM. KERSTEN.